May 19, 1953 — F. H. HUBBARD — 2,638,856
MOUNTING FOR PASTRY STRIP CUTTER WHEELS
Filed Sept. 2, 1950
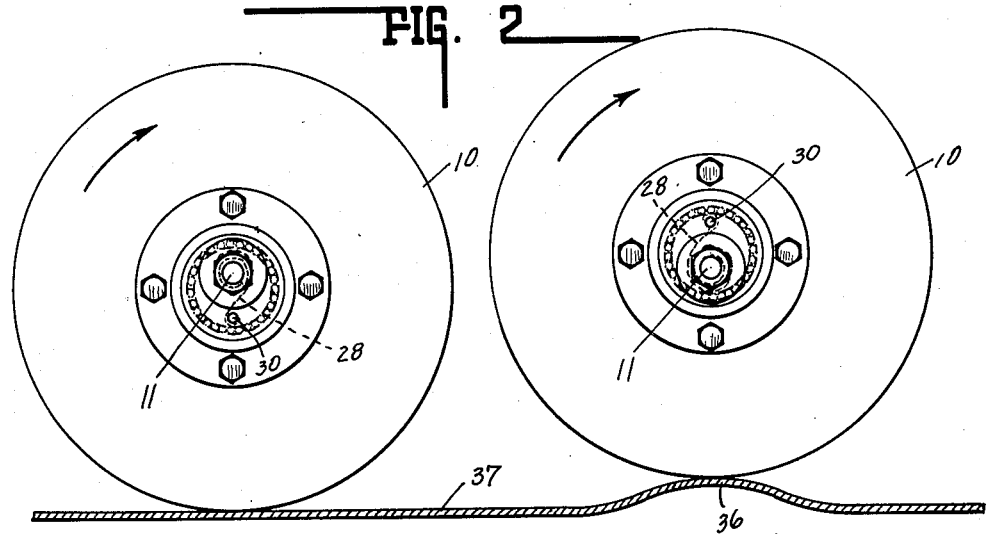
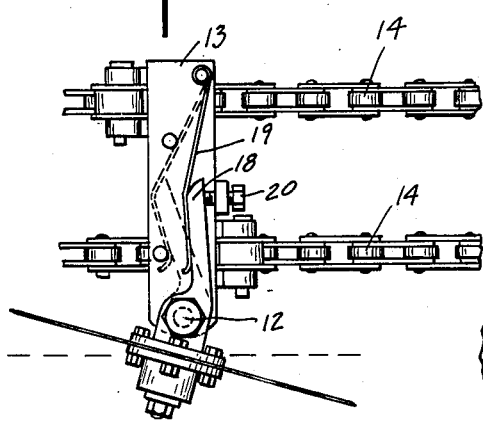
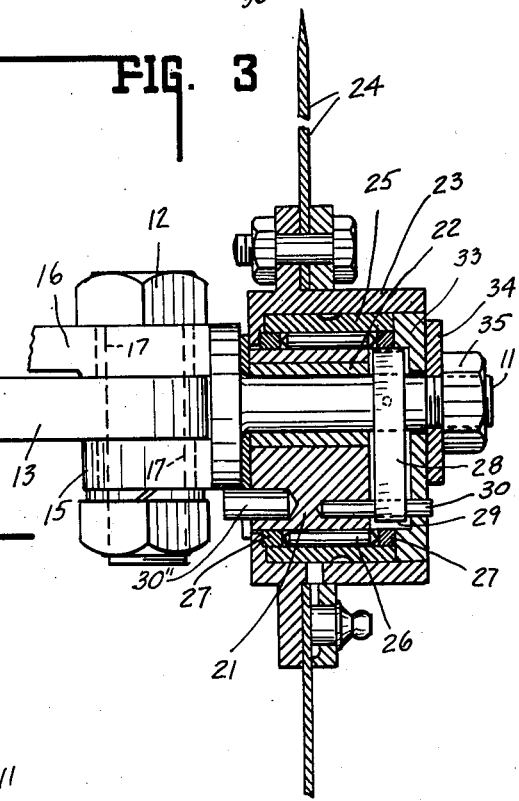
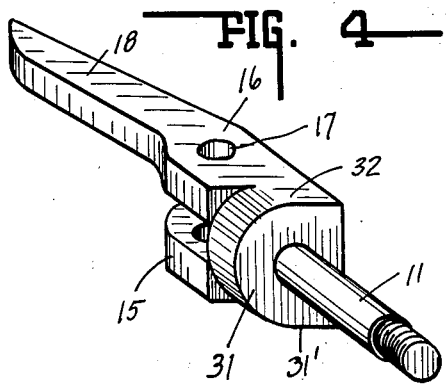
INVENTOR.
FRANK H. HUBBARD.
BY
Lockwood, Hahn, Galt & Woodard,
ATTORNEYS.

Patented May 19, 1953

2,638,856

UNITED STATES PATENT OFFICE 2,638,856

MOUNTING FOR PASTRY STRIP CUTTER WHEELS

Frank H. Hubbard, Indianapolis, Ind., assignor to Thomas L. Green & Company, Inc., Indianapolis, Ind., a corporation Application September 2, 1950, Serial No. 183,074

7 Claims. (Cl. 107—22)

The present invention relates to improvements in apparatus for cutting pastry strips and primarily to improvements in the manner of supporting the cutting discs of such apparatus.

The invention more specifically constitutes an improvement for the support of the cutting discs of the type illustrated in U. S. Letters Patent No. 2,283,838 granted May 19, 1942, to C. H. Williams for "Apparatus for Cutting Pastry Strips," and reference may be had to said patent for more detailed description of the structure of the apparatus as a whole.

Suffice to say, so far as the present invention is concerned the apparatus disclosed in that patent includes a plurality of cutting discs in an endless series which advance in echelon across the advancing strips of material to be cut which are generally fed through the medium of a traveling conveyor which conveyor is preferably formed of metal in that the conveyor is adapted to convey the material through an oven.

Considerable difficulty has been experienced in the past in machines of the above character in maintaining the cutting discs in their sharpened condition. The advancing conveyor being formed of metal and being subjected to the heat of the oven is subject to warping and the development of raised points in the surface thereof. As the discs move over the conveyor and come in contact with these raised or humped portions their edges are apt to become blunted and in some instances may even be nicked.

It is one of the objects of the present invention to provide a mounting which while permitting the discs to rotate during their cutting engagement with the material will in event the edges of the disc come in contact with an obstruction on the conveyor or a raised portion thereof permit the discs to freely ride over the obstruction thereby avoiding damage to the edge of the disc.

For the purpose of disclosing the invention I have illustrated an embodiment thereof in the accompanying drawing in which Fig. 1 is a plan view of the cutting discs and the mount therefor on its moving chain.

Fig. 2 is a side elevation showing two of the discs, the one on the left in normal cutting position and the one on the right in its raised position as a result of having come in contact with an obstruction on the conveyor.

Fig. 3 is a longitudinal sectional view of the cutting disc in its supporting mounting.

Fig. 4 is a perspective view showing the axle mounting for the disc.

In the embodiment illustrated, each of the series of cutting discs 10 is mounted on an axle 11 carried on pivots 12 of spaced frames 13 borne by a pair of endless chains 14. The axle 11 in order to accommodate the pivot 12 is bifurcated to provide a pair of spaced apart arms 15 and 16 adapted to embrace the plate member of the frame 13 and provided with pivot openings 17 to receive the pivot 12. The top arm 16 is provided with a rearwardly extending arm 18 which is biased to swing the axle 11 at an angle, by a spring 19 which forces the arm against an adjustable stop 20.

The above described structure is more fully disclosed in the above mentioned U. S. Letters Patent and reference may be had there for more detailed description of the specific structure.

According to my invention upon the axle 11 I mount an eccentric disc 21 which is rotatable on the axle, a suitable bushing 22 being interposed between the axle and the opening in the eccentric disc 21. Concentrically mounted on the eccentric disc 21 is the hub 23 of the cutting disc 24 which is provided with an inner sleeve 25 and between which and the outer face of the eccentric 21 are interposed roller bearings 26, being held in position by retainer rings 27—27.

A coiled spring 28 having its inner end anchored to the axle 11, surrounds the axle 11 and the free end 29 of this spring is looped over a pin 30 inserted in an opening in the face of the eccentric 21 at the high point of the eccentric. The spring is so tensioned as to bias the high part of the eccentric to the lowermost position, it being stopped against continued rotation in this direction through the medium of a pin 30'' which will engage the lower flat surface 31' of the enlarged portion 31 of the axle 11. The movement of the high point of the eccentric is likewise limited when it reaches the top of its travel by the pin 30'' engaging a similar flat surface 32.

A suitable cover plate 33 encloses the coiled spring and its associated parts being maintained in position by a washer 34 retained on the end of axle 11 by a hex nut 35.

By the above construction it is to be noted that under normal circumstances the eccentric is rotated under the influence of the coiled spring to position the high part or lobe of the eccentric on the underside of the axle whereby the disc is lowered to cutting position, being freely rotatable while in this position on the eccentric. In the event, however, the disc comes in contact with a raised point such as is illlustrated at 36 in a conveyor 37 the eccentric will be caused to rotate on the axle 11 and against the bias of the spring 28 so that the axis of rotation of the disc

The invention claimed is:

1. A support for pastry cutting discs comprising an axle, a bearing eccentrically rotatable on said axle, a cutting disc rotatably mounted on said bearing, resilient means for rotatably biasing said bearing in one direction, and means for limiting the rotatable movement of said bearing in two directions.

2. A support for pastry cutting discs comprising an axle, a bearing on said axle comprising an eccentric disc, a cutting disc concentrically rotatable on said bearing, and means for biasing said eccentric disc for rotation in a direction to yieldingly urge the cutting disc into engagement with the material to be operated upon.

3. A support for pastry cutting discs comprising an axle, an eccentric disc rotatably mounted on said axle, a cutting disc having a hub concentrically rotatably mounted on said eccentric disc, a coiled spring having one end secured to said axle and the opposite free end connected to said eccentric disc and tensioned to bias said eccentric disc with its lobe on the underside of said axle, and means for limiting the rotation of said eccentric disc in one direction against the bias of said spring.

4. A support for pastry cutting discs comprising an axle, an eccentric bearing rotatable on said axle, a cutting disc rotatably mounted on said bearing, and resilient means interposed between said axle and bearing for rotatably biasing said bearing to yieldingly urge said disc toward its normal cutting position.

5. A support for pastry cutting discs comprising an axle, an eccentric bearing rotatable on said axle, a cutting disc rotatably mounted on said bearing, resilient means for rotatably biasing said bearing to yieldingly urge said disc to cutting position, and means for limiting the movement of said bearing in its biased direction.

6. A support for pastry cutting discs comprising an axle, an eccentric bearing rotatable on said axle, a cutting disc rotatably mounted on said bearing, and a spring interposed between said axle and bearing to yieldingly permit rotation of said bearing on said axle by the engagement of said disc with an obstruction.

7. A support for pastry cutting discs comprising an axle, an eccentric disc rotatably mounted on said axle to provide an eccentric lobe, a cutting disc having a hub concentrically rotatably mounted on said eccentric disc, and a coiled spring having one end secured to said axle and the opposite free end connected to said eccentric disc and tensioned to bias said eccentric disc with its lobe on the underside of said axle in a direction to present and urge said cutting disc in its cutting position.

FRANK H. HUBBARD.

References Cited in the file of this patent

UNITED STATES PATENTS

| Number | Name | Date |
|---|---|---|
| 1,900,183 | Johnstone | Mar. 7, 1933 |
| 2,356,872 | Monaco | Aug. 24, 1944 |
| 2,555,984 | Mercier et al. | June 5, 1951 |